UNITED STATES PATENT OFFICE.

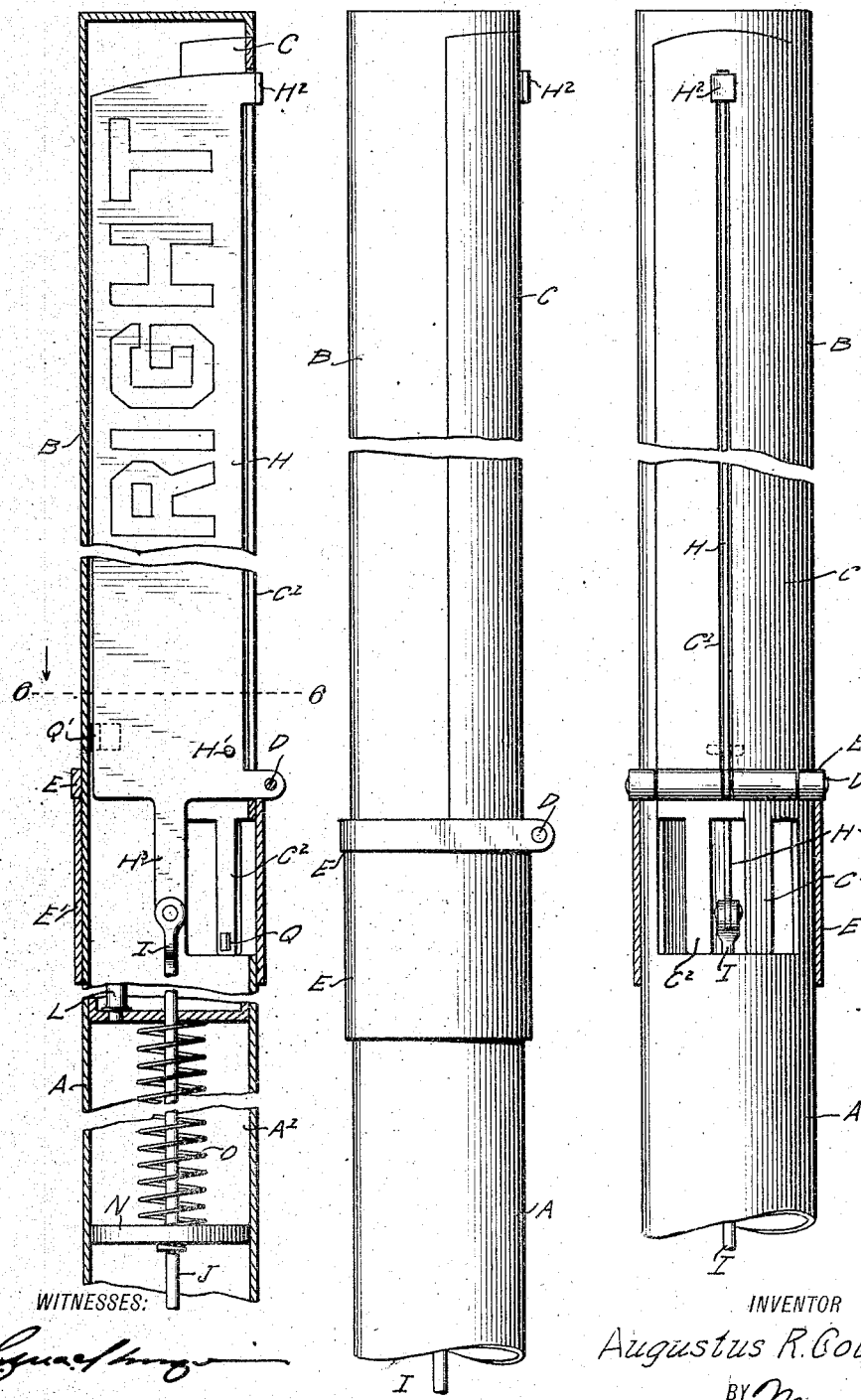

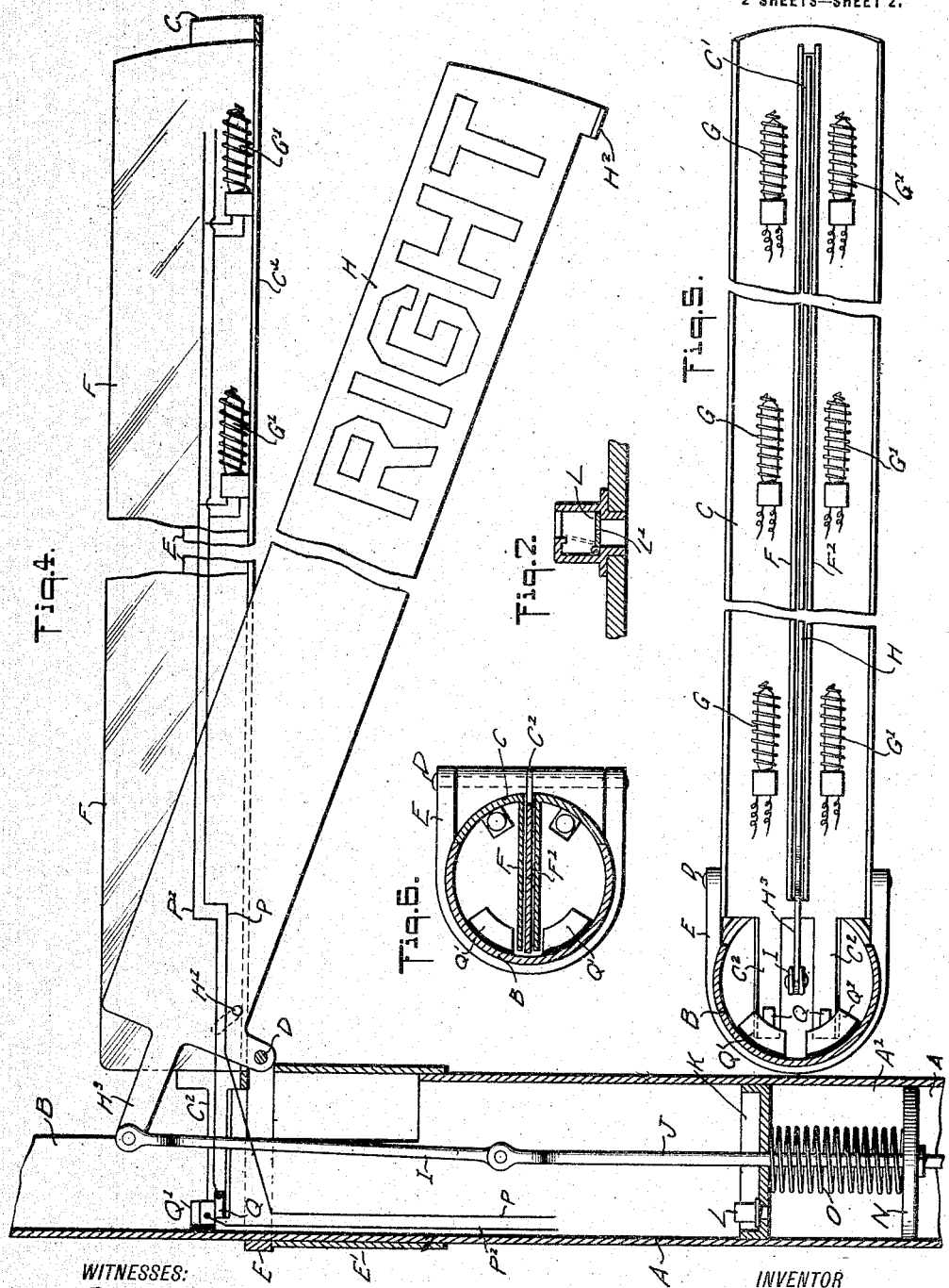

AUGUSTUS RAIFIELD COLGIN, OF NEW YORK, N. Y.

SIGNALING DEVICE.

1,174,691.   Specification of Letters Patent.   Patented Mar. 7, 1916.

Application filed April 7, 1915.   Serial No. 19,715.

*To all whom it may concern:*

Be it known that I, AUGUSTUS R. COLGIN, a citizen of the United States, and a resident of the city of New York, Richmond Hill, borough of Queens, in the county of Queens and State of New York, have invented a new and Improved Signaling Device, of which the following is a full, clear, and exact description.

The object of the invention is to provide a new and improved signaling device more especially designed for use on automobiles and other vehicles, and arranged to enable the driver to readily signal ahead to oncoming vehicles and to persons intending to cross a highway in front of the vehicle, and to signal rearwardly to following vehicles the intention of turning out to the right or to the left during the day or during the night.

In order to accomplish the desired result, use is made of a tubular casing having a fixed and a pivoted section, reflecting surfaces held in the said pivoted section and spaced apart, and a pivoted turn-out sign adapted to pass between the said reflecting surfaces and to extend at an angle thereto.

A practical embodiment of the invention is represented in the accompanying drawings forming a part of this specification, in which similar characters of reference indicate corresponding parts in all the views.

Figure 1 is a sectional side elevation of the signaling device with the parts in folded or in inactive position; Fig. 2 is a side elevation of the same; Fig. 3 is a front view of the same with part in section; Fig. 4 is a sectional side elevation of the same with the turn-out sign and the reflecting surfaces in extended or active position; Fig. 5 is a plan view of the same; Fig. 6 is a sectional plan view of the same with the parts in folded position, the section being on the line 6—6 of Fig. 1; and Fig. 7 is an enlarged sectional side elevation of the controlling valve for the dash pot.

The improved signaling device is mounted on a tubular casing A erected on an automobile or other vehicle, and the upper portion of the casing A is provided with a section B and a section C mounted to swing on a pivot D held on a bearing E provided with a sleeve E' and encircling the upper portion of the casing A. In the pivoted section C are arranged two longitudinally extending mirrors or other reflecting surfaces F, F' having their reflecting faces extending in opposite directions, that is, one forwardly and the other rearwardly. In the bottom of the pivoted section C and on opposite sides of the reflecting surfaces F and F' are arranged lamps G, G' to illuminate the said reflecting surfaces with a view to direct the rays of light forwardly ahead of the vehicle and rearwardly of the same during the night and at the time the section C is in open position, that is, approximately at a right angle to the casing A, as indicated in Figs. 4 and 5. It is understood that the upper portions of the reflecting surfaces F and F' extend above the sides of the pivoted section C so that the rays of light from the lamps G, G' are reflected forwardly and rearwardly by the reflecting surfaces F and F'. Thus the forwardly reflected rays of light provide a signal for oncoming vehicles or for persons intending to cross the highway in front of the vehicle, and the rearwardly reflected rays of light provide a signal for a following vehicle. The reflecting surfaces F and F' are spaced apart and the bottom of the section C is provided with a slot C' leading to the space between the reflecting surfaces F and F'. A turn-out sign H with a suitable legend thereon is adapted to pass through the slot C' between the reflecting surfaces F and F' to extend within the pivoted section C to be folded with the reflecting surfaces F and F' within the upper portion B of the casing A, as will be readily understood by reference to Figs. 1, 2, 3 and 6. The turn-out sign H is mounted to swing loosely on the pivot D and is provided near its fulcrum end with a transverse pin H' adapted to bear on the bottom of the pivoted section C so that when the outward swinging movement is given to the sign H the pin H' imparts an outward swinging movement to the section C to swing the latter into an extended angular position, as previously mentioned and shown in Figs. 4 and 5. When the section C reaches a right angle position the sign H continues its downward swinging movement until it stands at an angle to the section C to display its legend on the said sign to a following vehicle. The outer end of the sign H is provided at its bottom with lugs H² adapted to engage the under side of the section C at the time the sign H is swung upward so that the sign H carries the section C along and swings the same into closed or folded position.

The pivotal end of the sign H is provided with an arm H³ connected by a link I with a rod J extending downward in the tubular casing A and connected with a treadle or other mechanism under the control of the driver of the automobile or other vehicle. The rod J passes through a head K fixed in the casing A and provided with an air inlet valve L adapted to admit or discharge air from the cylindrical portion A′ of the casing A immediately below the head K. On the rod J is arranged a piston N on which bears a spring O abutting with its upper end against the under side of the head K. When the parts are in folded position as shown in Figs. 1, 2 and 3 and the operator presses the treadle and imparts an upward movement to the rod J, the rod J by the link I imparts an outward and downward swinging movement to the sign H to move the latter and the pivoted section C into extended position, as previously explained and shown in Figs 4 and 5. During the upward movement of the rod J the piston N presses the spring O and forces the air out of the cylindrical portion A′ by way of the valve L. When the operator releases the treadle the spring O forces the piston N and consequently the rod J downward to cause the sign H to swing back into folded position, and as the sign H carries the section C along, it is evident that the latter also returns into the folded position shown in Figs. 1, 2, 3 and 6.

In order to prevent a too sudden return movement of the sign H and the section C, the valve L is provided with a small aperture L′ to allow a gradual filling of the cylindrical portion A′ with air thus retarding the downward movement of the piston N, the rod J and link I with the result that the sign H and the section C close gradually instead of suddenly. The lamps G and G′ are preferably electric lamps connected by wires P and P′, P² with a suitable source of electrical energy. The wires P extend through the tubular casing A and the wires P′ are connected with insulated contacts Q on arms C² projecting from the pivotal end of the section C into the casing A. The contacts Q are adapted to abut against the underside of contacts Q′ held insulated on the inner side of the fixed section B so that the contacts Q′ form stops for the contacts Q and for the section C to hold the latter in a right angle position relative to the tubular casing A at the time the sign H and the said section C are in the extended position shown in Figs. 4 and 5. From the contacts Q′ lead the wires P² and pass through the tubular casing A to the source of electrical energy. It will be noticed that when the section C is in folded position the contacts Q and Q′ are out of engagement with each other and consequently the circuit for the lamps G, G′ is broken, but when the section C is swung into a right angle position the contacts Q move into engagement with the contacts O to form a stop for the section C and to close the circuit for the lamps G, G′ to light the latter and thus cause the rays of light to be reflected by the reflecting surfaces F, F′, as previously explained.

It is understood that in practice two signaling devices such as shown and described are mounted on opposite sides of the vehicle, one device having the sign H and the section C swinging out toward the right, and the other device toward the left when the corresponding treadle is pressed to indicate to a following vehicle that the driver intends to turn out to the right or to the left according to whichever sign is in extended active position at the time.

By arranging the contacts Q and Q′ in the manner described, the lamps G and G′ are not lighted during the time the sign H and the section C are in folded position.

Having thus described my invention, I claim as new and desire to secure by Letters Patent:

1. A signaling device provided with two reflecting surfaces, of which one faces forwardly and the other rearwardly, and a turn-out sign adapted to pass between the said surfaces and to extend at an angle thereto.

2. A signaling device provided with two reflecting surfaces, of which one faces forwardly and the other rearwardly, illuminating means for illuminating the said reflecting surfaces, and a turn-out sign adapted to pass between the said surfaces and to extend at an angle thereto.

3. A signaling device, comprising a tubular casing having a fixed and a pivoted section, reflecting surfaces held in the said pivoted section and spaced apart, and a pivoted turn-out sign adapted to pass between the said reflecting surfaces and to extend at an angle thereto.

4. A signaling device, comprising a tubular casing having a fixed and a pivoted section, reflecting surfaces held in the said pivoted section and spaced apart, illuminating means arranged on the said pivoted section for illuminating the said reflecting surfaces, and a pivoted turn-out sign adapted to pass between the said reflecting surfaces and to extend at an angle thereto.

5. A signaling device, comprising a tubular casing having a fixed and a pivoted section, reflecting surfaces held in the said pivoted section and spaced apart, a pivoted turn-out sign adapted to pass between the said reflecting surfaces and to extend at an angle thereto, manually controlled means connected with the said turn-out sign for swinging the latter into an angular position relative to the said pivoted section, and means for moving the said pivoted section with the turn-out sign into folded or angular position relative to the said fixed section.

6. A signaling device, comprising a tubular casing having a fixed and a pivoted section, reflecting surfaces held in the said pivoted section and spaced apart, a pivoted turn out sign adapted to pass between the said reflecting surfaces and to extend at an angle thereto, a spring-pressed rod connected with the said turn-out sign and under the control of the driver of the automobile to permit of swinging the turn-out sign into display position, and means on the said turn-out sign adapted to engage the said pivoted section to move the latter into display or into folded position.

7. A signaling device, comprising a tubular casing having a fixed and a pivoted section, reflecting surfaces held in the said pivoted section and spaced apart, the said pivoted section having a slot leading to the space between the said reflecting surfaces, and a pivoted turnout sign adapted to pass through the slot between the reflecting surfaces.

8. A signaling device, comprising a tubular casing having a fixed and a pivoted section, reflecting surfaces held in the said pivoted section and spaced apart, the said pivoted section having a slot leading to the space between the said reflecting surfaces, a pivoted turn-out sign adapted to pass through the slot between the reflecting surfaces, and lugs on the said turn-out sign and adapted to engage the said pivoted casing section to swing the latter into folded or extended position.

9. A signaling device, comprising tubular casing having a fixed and a pivoted section, reflecting surfaces held in the said pivoted section and spaced apart, a pivoted turn-out sign adapted to pass between the said reflecting surfaces and to extend at an angle thereto, a spring-pressed rod connected with the said turn-out sign and under the control of the driver of the automobile to permit of swinging the turn-out sign into display position, means on the said turn-out sign adapted to engage the said pivoted section to move the latter into display or into folded position, and a dash pot connected with the said rod.

In testimony whereof I have signed my name to this specification in the presence of two subscribing witnesses.

AUGUSTUS RAIFIELD COLGIN.

Witnesses:
  THEO. G. HOSTER,
  PHILIP D. ROLLHAUS.